US010267370B2

(12) United States Patent
Hammer

(10) Patent No.: US 10,267,370 B2
(45) Date of Patent: Apr. 23, 2019

(54) DISC BRAKE ROTOR ADAPTER

(71) Applicant: SAF-HOLLAND, Inc., Holland, MI (US)

(72) Inventor: Edward Hammer, Muskegon, MI (US)

(73) Assignee: SAF-HOLLAND, Inc., Holland, MI (US)

(*) Notice: Subject to any disclaimer, the term of this patent is extended or adjusted under 35 U.S.C. 154(b) by 0 days.

(21) Appl. No.: 15/373,181

(22) Filed: Dec. 8, 2016

(65) Prior Publication Data
US 2017/0227077 A1  Aug. 10, 2017

Related U.S. Application Data

(60) Provisional application No. 62/293,112, filed on Feb. 9, 2016.

(51) Int. Cl.
F16D 65/12 (2006.01)
F16D 65/02 (2006.01)

(52) U.S. Cl.
CPC .... *F16D 65/123* (2013.01); *F16D 2065/1316* (2013.01); *F16D 2065/1328* (2013.01); *F16D 2065/1344* (2013.01); *F16D 2065/1384* (2013.01); *F16D 2065/1392* (2013.01)

(58) Field of Classification Search
CPC .......... F16D 65/123; F16D 2065/1392; F16D 2051/003; F16D 2065/1356; F16D 2065/1352
See application file for complete search history.

(56) References Cited

U.S. PATENT DOCUMENTS

| 6,152,270 | A | 11/2000 | Giorgetti |
| 6,357,557 | B1 | 3/2002 | Di Ponio |
| 6,564,912 | B1 | 5/2003 | Koschinat |
| 6,910,556 | B1 * | 6/2005 | Baumgartner ......... F16D 65/12 188/18 A |
| 7,096,920 | B2 | 8/2006 | Debus |

(Continued)

FOREIGN PATENT DOCUMENTS

| DE | 19836688 | 3/2000 |
| DE | 102005023380 | 10/2006 |
| WO | 2009154548 | 12/2009 |

OTHER PUBLICATIONS

European Patent Office; Extended European Search Report; dated Jul. 17, 2017.

*Primary Examiner* — Bradley T King
*Assistant Examiner* — James K Hsiao
(74) *Attorney, Agent, or Firm* — Prince Heneveld LLP

(57) ABSTRACT

A brake adapter arrangement includes a bearing hub that includes a body portion having a first end, a second end and a longitudinally-extending axis extending between the first and second ends, wherein the first end includes at least one first protuberance extending radially outward from the body portion and the second end includes at least one second protuberance extending radially outward from the body portion, and wherein the at least one first protuberance is at least partially linearly misaligned from the at least one second protuberance, and a friction ring having a central opening that receives at least a portion of the bearing hub therein, wherein the friction ring at least partially surrounds the second protuberance of the bearing hub.

23 Claims, 3 Drawing Sheets

(56) References Cited

U.S. PATENT DOCUMENTS

| | | | |
|---|---|---|---|
| 7,918,322 B2* | 4/2011 | Pahle | F16D 65/123 188/18 A |
| 8,037,980 B2* | 10/2011 | Pahle | F16D 65/123 188/18 A |
| 8,651,247 B2* | 2/2014 | Burgoon | F16D 65/123 188/18 A |
| 8,939,266 B2 | 1/2015 | Anderson | |
| 8,950,556 B2 | 2/2015 | Root | |
| 8,967,339 B2 | 3/2015 | Drewes | |
| 2003/0006104 A1* | 1/2003 | Baumgartner | F16D 65/123 188/17 |
| 2004/0040803 A1 | 3/2004 | Debus et al. | |
| 2004/0207249 A1* | 10/2004 | Baumgartner | F16D 65/123 301/105.1 |
| 2009/0260933 A1 | 10/2009 | Pahle | |
| 2010/0263970 A1 | 10/2010 | Botsch et al. | |
| 2011/0290602 A1 | 12/2011 | Kleber et al. | |
| 2012/0247881 A1* | 10/2012 | Root | B60B 27/0052 188/18 A |
| 2013/0133998 A1 | 5/2013 | Maronati et al. | |
| 2014/0048361 A1 | 2/2014 | Kloos | |
| 2014/0374200 A1* | 12/2014 | Root | B60B 27/0052 188/18 A |
| 2015/0015057 A1 | 1/2015 | Oberti et al. | |
| 2015/0021128 A1 | 1/2015 | White et al. | |
| 2015/0167763 A1 | 6/2015 | Kleber et al. | |

\* cited by examiner

DISC BRAKE ROTOR ADAPTER

CROSS-REFERENCE TO RELATED APPLICATIONS

This application claims the benefit of U.S. Provisional Patent Application No. 62/293,112, filed on Feb. 9, 2016, entitled "DISC BRAKE ROTOR ADAPTER," the entire discloser of which is incorporated herein by reference.

BACKGROUND OF THE INVENTION

The present invention relates to a brake rotor adapter, and in particular to a disc brake rotor adapter for use within a heavy-duty vehicle suspension arrangement.

BRIEF SUMMARY OF THE INVENTION

One aspect of the present invention includes a brake adapter arrangement that includes a bearing hub that includes a body portion having a first end, a second end and a longitudinally-extending axis extending between the first end and the second end, wherein the first end includes at least one first protuberance extending radially outward from the body portion and the second end includes at least one second protuberance extending radially outward from the body portion, and wherein the at least one first protuberance is at least partially linearly misaligned from the at least one second protuberance, and a friction ring having a central opening that receives at least a portion of the bearing hub therein, wherein the friction ring at least partially surrounds the second protuberance of the bearing hub.

Another aspect of the present invention includes a brake adapter arrangement that includes a bearing hub that includes a body portion having a first end and a second end, wherein the first end includes at least one first protuberance and the second end includes at least one second protuberance, and wherein the at least one first protuberance is at least partially radially aligned with and at least partially linearly misaligned from the at least one second protuberance, and a friction ring having a central opening that receives at least a portion of the bearing hub therein, wherein the friction ring at least partially surrounds the second protuberance of the bearing hub.

The present inventive disc brake rotor adapter is highly durable and incorporates an uncomplicated design that allows for reduced manufacturing costs. As a result, the present inventive brake rotor adapter is economical to manufacture, capable of a long operating life, and particularly well adapted to the proposed use.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
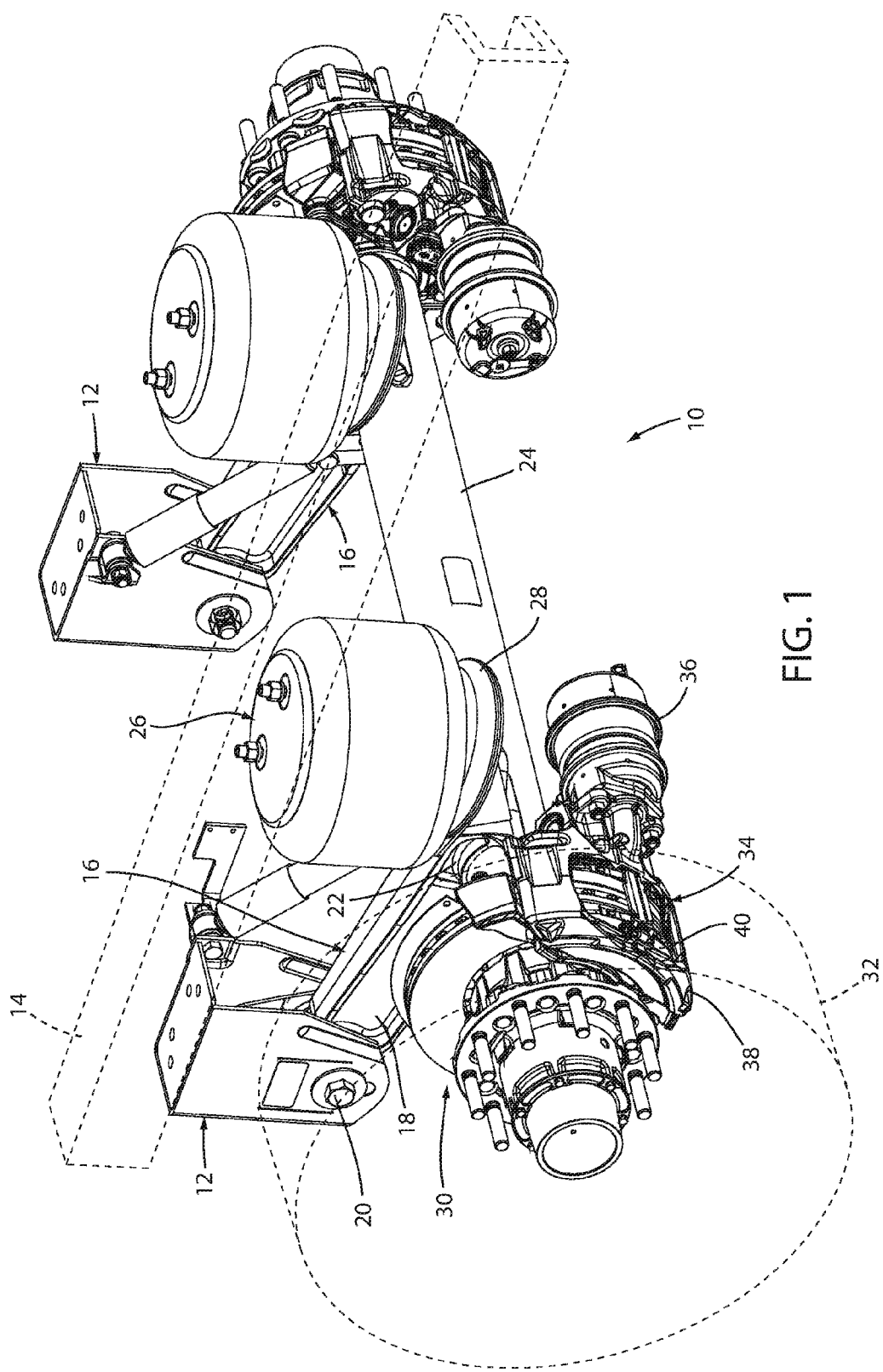
FIG. 1 is a perspective view of a suspension arrangement that includes a brake adapter arrangement.
Figure 3:
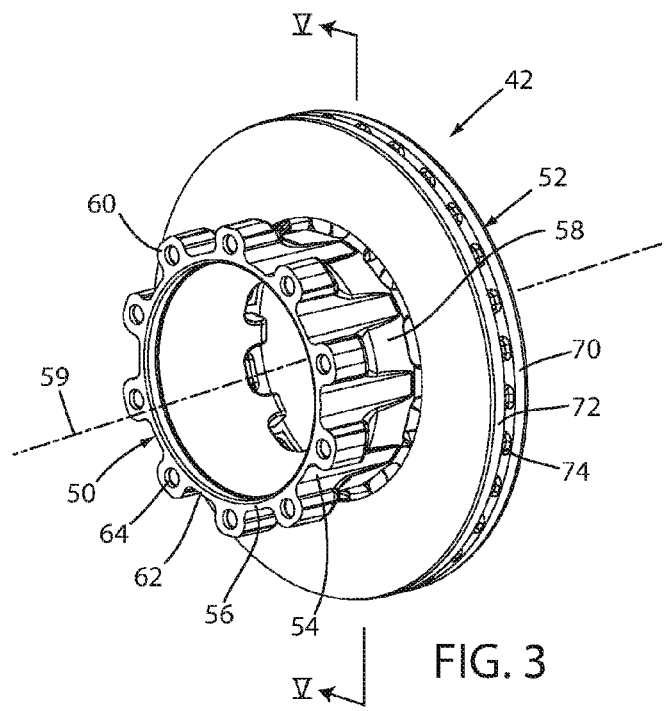
FIG. 3 is a perspective view of the brake adapter arrangement.
Figure 5:
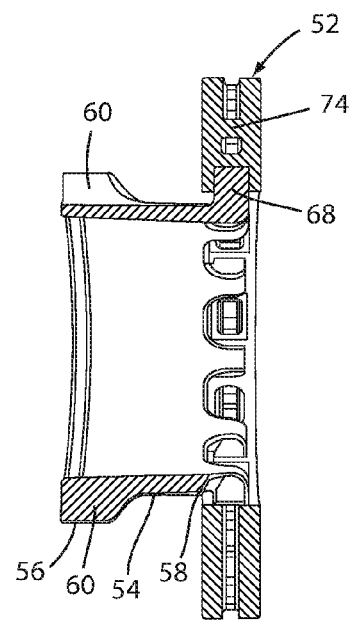
FIG. 5 is a cross-sectional end view of the brake adapter arrangement taken along the line V-V, FIG. 3.

For purposes of description herein, the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a heavy-duty suspension arrangement for use with large towing vehicles such as semi-tractors, and heavy-duty trailers associated therewith. In the illustrated example, the suspension arrangement 10 includes a pair of mounting brackets 12 connected to and supporting corresponding longitudinally-extending vehicle frame members 14, and trailing arms 16 pivotably coupled at a first end 18 to the mounting brackets 12 via a pin and bushing arrangement 20, and fixedly secured at a second end 22 to an axle member 24. The suspension arrangement 10 further includes a pair of air spring assemblies 26 extending between a spring seat member 28 cantilevered from the second end 22 of the trailing arm 16 and one of the vehicle frame members 14. The suspension arrangement 10 still further includes wheel mounting hub arrangements 30 configured to rotatably mount wheel assemblies 32 to the ends of the axle member 24, and a pair of brake arrangements 34. Each brake arrangement 34 includes a pneumatic brake actuator 36 mounted to an associated brake caliper 38 to which brake pads 40 are actuably mounted.

Figure 2:
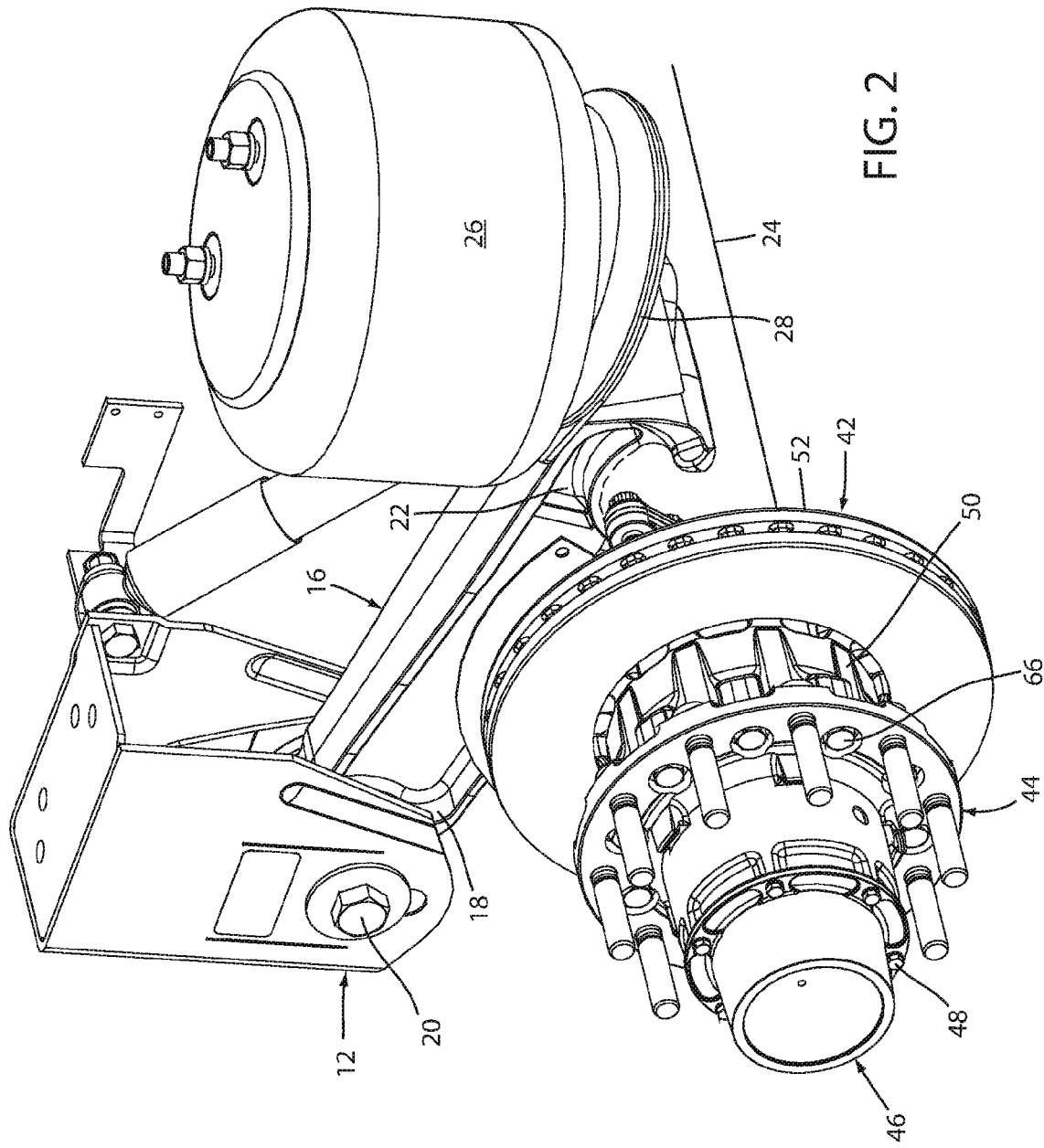
FIG. 2 is an enlarged perspective view of the suspension arrangement and the brake adapter arrangement.

A brake adapter arrangement 42 (FIG. 2) is rotatably supported from the axle member 24 via a spindle assembly (not shown). A wheel hub disc member 44 is connected to the brake adapter arrangement 40, as described below, and an axle hub cap 46 is secured to a distal end of the hub disc member 44 via a plurality of mechanical fasteners such as bolts 48.

Figure 4:
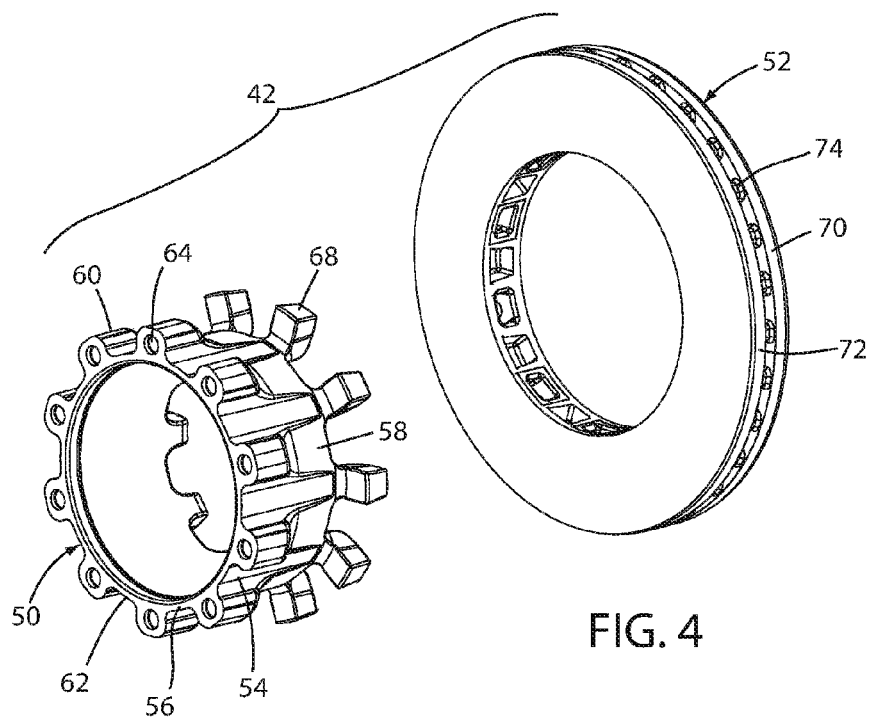
FIG. 4 is an exploded perspective view of a bearing hub member and a friction ring of the brake adapter arrangement.

The brake adapter arrangement 42 includes a bearing hub member 50 and a friction ring 52. In the illustrated example, the bearing hub member 50 (FIGS. 3 and 4) includes a cylindrically-shaped body portion 54 having a first end 56 and a second end 58 with a longitudinal axis 59 extending therebetween. The first end 56 includes a plurality of protrusions or protuberances 60 extending radially outward from the body portion 54 and equally spaced about a periphery of the body portion 54. In the present example, the protrusions 60 cooperate to define recesses 62 interspaced therewith. Each protrusion includes an axially-extending threaded aperture 64 that receives a mechanical fastener such as a bolt 66 that secures the bearing hub member 50 to the wheel hub disc member 44. The bearing hub member 50 further includes a plurality of protrusions or protuberances 68 extending radially outward from the second end 58 of the body portion 54 and equally spaced about the periphery of the body portion 54. The protrusions 60 located at the first end 56 of the body portion 54 are completely radially offset from the protrusions 68 located at the second end 58 of the body portion 54 such that the protrusions 60 and the protrusions 68 are completely misaligned in a linear direction. The bearing hub member 50, including the body portion 54, the plurality of protrusions 60 and the plurality of protrusions 68 is cast as a single, integral piece. Each protrusion 68 has a trapezoidal-shaped cross-sectional configuration, however, other suitable cross-sectional configurations may be utilized.

The friction ring 52 includes an inner ring portion 70 and an outer ring portion 72. A plurality of spacing pins 74 are located between the inner ring portion 70 and the outer ring portion 72 to space the ring portions 70, 72 from one another to facilitate cooling of the friction ring 52 during operation of the associated brake system. The friction ring 52 is cast about the preformed bearing hub member 50 such that the friction ring 52 surrounds each of the protuberances 68, thereby securing the friction ring 52 to the bearing hub member 50 to form the brake adapter arrangement 42.

The present inventive disc brake rotor adapter is highly durable and incorporates an uncomplicated design that allows for reduced manufacturing costs. As a result, the present inventive brake rotor adapter is economical to manufacture, capable of a long operating life, and particularly well adapted to the proposed use.

In the foregoing description, it will be appreciated by those skilled in the art that modifications may be made to the invention without departing from the concepts disclosed herein. Such modifications are to be considered as included in the following claims, unless the claims by their language expressly state otherwise.

The invention claimed is as follows:

1. A brake adapter arrangement, comprising:
a bearing hub including a body portion having a first end, a second end and a longitudinally-extending axis extending between the first end and second end, wherein the first end includes at least one first protuberance extending radially outward from the body portion and the second end includes at least one second protuberance extending radially outward from the body portion, wherein the at least one first protuberance is at least partially linearly misaligned from the at least one second protuberance, and wherein the at least one second protuberance is located a same radial distance from the axis as the at least one first protuberance; and
a friction ring having a central opening that receives at least a portion of the bearing hub therein, wherein the friction ring at least partially surrounds the at least one second protuberance of the bearing hub such that the friction ring abuts an axially inward facing surface and an axially outward facing surface of the at least one first protuberance.

2. The brake adapter arrangement of claim 1, wherein the at least one first protuberance and the at least one second protuberance are completely linearly misaligned with one another.

3. The brake adapter arrangement of claim 1, wherein the at least one first protuberance is a plurality of first protuberances spaced about a periphery of the body portion.

4. The brake adapter arrangement of claim 1, wherein the at least one second protuberance is a plurality of second protuberances spaced about a periphery of the body portion.

5. The brake adapter arrangement of claim 1, wherein the friction ring comprises a cast metal cast onto the bearing hub to form a cast connection between the friction ring and the bearing hub.

6. The brake adapter arrangement of claim 1, wherein the at least one first protuberance is configured to couple to a wheel hub disk member.

7. The brake adapter arrangement of claim 6, wherein the at least one first protuberance includes an aperture configured to receive a mechanical fastener therein to couple a wheel hub disk to the bearing hub.

8. The brake adapter arrangement of claim 1, wherein the at least one second protuberance includes a trapezoidal-shaped cross-section.

9. The brake adapter arrangement of claim 1, wherein at least a portion of the at least one first protuberance is radially aligned with at least a portion of the at least one second protuberance.

10. A brake adapter arrangement, comprising:
a bearing hub including a body portion having a first end and a second end, wherein the first end includes at least one first protuberance and the second end includes at least one second protuberance, wherein the at least one first protuberance is at least partially linearly misaligned from the at least one second protuberance, and wherein the at least one second protuberance is located a same radial distance from a longitudinal axis of the bearing hub as the at least one first protuberance; and
a friction ring having a central opening that receives at least a portion of the bearing hub therein, wherein the friction ring comprises a cast metal cast onto the bearing hub such that the friction ring at least partially surrounds the at least one second protuberance of the bearing hub.

11. The brake adapter arrangement of claim 10, wherein the at least one first protuberance and the at least one second protuberance are completely linearly misaligned with one another.

12. The brake adapter arrangement of claim 10, wherein the at least one first protuberance is a plurality of first protuberances spaced about a periphery of the body portion.

13. The brake adapter arrangement of claim 10, wherein the at least one second protuberance is a plurality of second protuberances spaced about a periphery of the body portion.

14. The brake adapter arrangement of claim 10, wherein the friction ring comprises a cast metal cast onto the bearing hub to form a cast connection between the friction ring and the bearing hub.

15. The brake adapter arrangement of claim 10, wherein the at least one first protuberance is configured to couple to a wheel hub disk.

16. The brake adapter arrangement of claim 15, wherein the at least one first protuberance includes an aperture configured to receive a mechanical fastener therein to couple a wheel hub disk to the bearing hub.

17. The brake adapter arrangement of claim 10, wherein the at least one second protuberance includes a trapezoidal-shaped cross-section.

18. The brake adapter arrangement of claim 10, wherein the body portion includes a longitudinally-extending axis extending between the first and second ends, and wherein the at least one first protuberance extends radially outward from the body portion.

19. The brake adapter arrangement of claim 10, wherein the body portion includes a longitudinally-extending axis extending between the first and second ends, and wherein the at least one second protuberance extends radially outward from the body portion.

20. A brake adapter arrangement, comprising:
a bearing hub including body portion having a first end, a second end and a longitudinally-extending axis extending between the first and second ends, wherein the first end includes a plurality of first protuberances extending radially outward from the body portion and configured to couple to a wheel hub disk and the second end includes a plurality of second protuberance extending radially outward from the body portion, and wherein the plurality of first protuberances is completely linearly misaligned from the plurality of second protuberances, and wherein the plurality of second protuberances are located a same radial distance from the axis as the plurality of first protuberances; and a friction ring having a central opening that receives at least a portion of the bearing hub therein, wherein the friction ring comprises a cast metal cast onto the bearing hub to form a cast connection between the friction ring and the bearing hub such that the friction ring surrounds the plurality of second protuberances of the bearing hub.

21. A brake adapter arrangement, comprising:

a bearing hub including a body portion having a first end, a second end and a longitudinally-extending axis extending between the first end and second end, wherein the first end includes at least one first protuberance extending radially outward from the body portion and the second end includes at least one second protuberance extending radially outward from the body portion, and wherein the at least one first protuberance is at least partially linearly misaligned from the at least one second protuberance; and a friction ring having a central opening that receives at least a portion of the bearing hub therein, wherein the friction ring at least partially surrounds the at least one second protuberance of the bearing hub such that the friction ring abuts an axially inward facing surface and an axially outward facing surface of the at least one first protuberance.

22. A brake adapter arrangement, comprising:

a bearing hub including a body portion having a first end and a second end, wherein the first end includes at least one first protuberance and the second end includes at least one second protuberance, and wherein the at least one first protuberance is at least partially radially aligned with and at least at least partially linearly misaligned from the at least one second protuberance; and a friction ring having a central opening that receives at least a portion of the bearing hub therein, wherein the friction ring at least partially surrounds the at least one second protuberance of the bearing hub such that the friction ring abuts an axially inward facing surface and an axially outward facing surface of the at least one first protuberance.

23. A brake adapter arrangement, comprising:

a bearing hub including body portion having a first end, a second end and a longitudinally-extending axis extending between the first and second ends, wherein the first end includes a plurality of first protuberances extending radially outward from the body portion and configured to couple to a wheel hub disk and the second end includes a plurality of second protuberance extending radially outward from the body portion, and wherein the plurality of first protuberances is completely linearly misaligned from the plurality of second protuberances; and a friction ring having a central opening that receives at least a portion of the bearing hub therein, wherein the friction ring comprises a cast metal cast onto the bearing hub to form a cast connection between the friction ring and the bearing hub such that the friction ring surrounds the plurality of second protuberances of the bearing hub such that the friction ring abuts an axially inward facing surface and an axially outward facing surface of the at least one first protuberance.

* * * * *